US008685160B2

(12) United States Patent
Seung, II et al.

(10) Patent No.: US 8,685,160 B2
(45) Date of Patent: Apr. 1, 2014

(54) SUBSTRATE HAVING FULLERENE THIN WIRES AND METHOD FOR MANUFACTURE THEREOF

(75) Inventors: Cha Seung, II, Ibaraki (JP); Kunichi Miyazawa, Ibaraki (JP); Jedeok Kim, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 680 days.

(21) Appl. No.: 12/733,411

(22) PCT Filed: Aug. 29, 2008

(86) PCT No.: PCT/JP2008/065579
§ 371 (c)(1),
(2), (4) Date: Sep. 24, 2010

(87) PCT Pub. No.: WO2009/028682
PCT Pub. Date: Mar. 5, 2009

(65) Prior Publication Data
US 2011/0008571 A1    Jan. 13, 2011

(30) Foreign Application Priority Data

Aug. 29, 2007 (JP) .................................. 2007-221960

(51) Int. Cl.
| C30B 7/00 | (2006.01) |
| C30B 7/14 | (2006.01) |
| C30B 29/10 | (2006.01) |
| B05D 1/34 | (2006.01) |
| B05D 5/00 | (2006.01) |

(52) U.S. Cl.
USPC .................. 117/18; 117/25; 117/33; 117/68; 117/921; 427/581; 427/113; 427/117; 427/430.1; 427/903

(58) Field of Classification Search
None
See application file for complete search history.

(56) References Cited

U.S. PATENT DOCUMENTS

| 6,251,522 B1 * | 6/2001 | Tanaka et al. ................. 428/408 |
| 6,890,505 B2 * | 5/2005 | Miyazawa et al. ......... 423/447.2 |
| 7,351,284 B2 * | 4/2008 | Yoshii .............................. 117/68 |
| 7,976,814 B2 * | 7/2011 | Miyazawa et al. ......... 423/445 B |
| 8,137,740 B2 * | 3/2012 | Lee et al. ......................... 427/58 |
| 8,246,926 B2 * | 8/2012 | Miyazawa et al. ......... 423/445 B |
| 8,286,803 B2 * | 10/2012 | Nowak et al. ................. 210/490 |

(Continued)

FOREIGN PATENT DOCUMENTS

| EP | 1 681 264 A1 * | 7/2006 | ............. C01B 31/02 |
| JP | 2005-254393 A * | 9/2005 | ............. C01B 31/02 |

(Continued)

OTHER PUBLICATIONS

Miyazawa et al.; "Fabrication and Properties of Fullerene Nanowhiskers and Nanofibers"; Transactions of the Materials Research Society of Japan; 29 [5], 2004(no month); pp. 1965-1968.*

(Continued)

*Primary Examiner* — Marianne L Padgett
(74) *Attorney, Agent, or Firm* — Wenderoth, Lind & Ponack, L.L.P.

(57) ABSTRACT

Provided is a fullerene thin wires-attached substrate in which fullerene thin wires are vertically aligned relative to the surface of the substrate and which is applicable to catalysts, column materials, chemical synthesis templates, field emission devices, field effect transistors, photonic crystals, etc.

4 Claims, 7 Drawing Sheets

(56) References Cited

U.S. PATENT DOCUMENTS

| | | | | |
|---|---|---|---|---|
| 8,591,741 | B2* | 11/2013 | Wang et al. | 210/652 |
| 2003/0077515 | A1* | 4/2003 | Chen et al. | 429/231.8 |
| 2005/0040090 | A1* | 2/2005 | Wang et al. | 210/184 |
| 2006/0257556 | A1* | 11/2006 | Dai et al. | 427/122 |
| 2008/0063585 | A1* | 3/2008 | Smalley et al. | 423/414 |
| 2008/0075954 | A1* | 3/2008 | Wardle et al. | 428/339 |
| 2008/0089827 | A1 | 4/2008 | Miyazawa et al. | |
| 2008/0176058 | A1* | 7/2008 | Maschmann et al. | 428/315.5 |
| 2008/0308209 | A1* | 12/2008 | Loutfy et al. | 156/62.2 |
| 2009/0311166 | A1* | 12/2009 | Hart et al. | 423/445 B |
| 2010/0171409 | A1* | 7/2010 | Ando et al. | 313/311 |
| 2011/0181170 | A1* | 7/2011 | Gamo et al. | 313/309 |
| 2011/0250451 | A1* | 10/2011 | Heintz et al. | 428/401 |
| 2011/0253630 | A1* | 10/2011 | Bakajin et al. | 210/651 |

FOREIGN PATENT DOCUMENTS

| | | | | |
|---|---|---|---|---|
| JP | 2005-289726 A | * | 10/2005 | C01B 31/02 |
| JP | 2005-306706 A | * | 11/2005 | C01B 31/02 |
| JP | 3785454 B2 | | 3/2006 | |
| JP | 2006-124266 A | * | 5/2006 | C01B 31/02 |
| JP | 2007-136557 A | * | 6/2007 | C01B 31/02 |
| JP | 2008-127237 A | * | 6/2008 | C01B 31/02 |
| WO | WO2005/035480 A1 | * | 4/2005 | C07C 69/608 |
| WO | WO 2005/090232 A1 | * | 9/2005 | C01B 31/02 |

OTHER PUBLICATIONS

Kun'ichi Miyakawa et al.; "Transmission electron microscopy investigation of tubular and capsular needlelike crystals of C60 produced by the liquid-liquid interfacial precipitation method"; J. Mater. Res., vol. 19, #11 (Materials Research Society, Rapid Communications); Nov. 2004; pp. 3145-3148.*

Miyakawa et al.; "Transmission electron microscopy investigation of fullerene nanotube whiskers and needle-likeprecipitates formed by using C60 and (n2-C60)Pt(PPh3)2"; J. Mater. Res., vol. 19, #8; Aug. 2004 (Materials Research Society); pp. 2410-2414.*

Zhong et al.; "Low Temperature Synthesis of Extremely Dance and Vertically Aligned Single-Walled Carbon Nanotubes"; Japanese Journal of Applied Physics, vol. 44, #4A; Apr. 8, 2005; pp. 1558-1561.*

Zhang et al.; "Ultra-high-yield growth of vertical single-walled carbon nanotubes: Hidden rules of hydrogen and oxygen"; PNAS, vol. 102, #45; Nov. 8, 2005; pp. 16141-16145.*

Murakami et al.; "Growth of vertically aligned single-walled carbon nanotube films on quartz substrates and their optical anisotropy"; Chemical Physical Letters, 358 (2004), published online Jan. 22, 2004; pp. 298-303.*

Shoushan Fan et al.; "Self-Oriented Regular Arrays of Carbon Nanotubes and Their Field Emissions Properties"; Science (Reports), vol. 283; Jan. 22, 1999; pp. 512-514.*

Hata et al.; "Water-Assisted Highly Efficient Synthesis of Impurity-Free Single-Waldo Carbon Nanotubes"; Science (Reports), vol. 306; Nov. 19, 2004; pp. 1362-1364.*

Eres et al.; "Molecular Beam-Controlled Nucleation and Growth of Vertically Aligned Single-Wall Carbon Nanotubes Arrays"; Journal of Physical Chemistry B; vol. 109 (2005), published online Aug. 11, 2005; pp. 16684-16694.*

Miyazawa et al.; "Structure and properties of fullerene nanowhiskers prepared by the liquid-liquid interfacial precipitation method"; Smart Materials III (Alan R Wilson, editor), Proceedings of SPIE, vol. 5648; 2005 (no month); pp. 224-234.*

Webster's Ninth New Collegiate Dictionary; Merriam-Webster's incorporated, publishers; Springfield, Massachusetts, USA; 1990 (no month; excerpt p. 476.*

Kun'ichi Miyazawa et al., "Transmission electron microscopy investigation of tubular and capsular needlelike crystals of $C_{60}$ produced by the liquid-liquid interfacial precipitation method", J. Mater. Res., vol. 19, No. 11, Nov. 2004, pp. 3145-3148.

Kun'ichi Miyazawa et al., "Structural characterization of the fullerene nanotubes prepared by the liquid-liquid interfacial precipitation method", J. Mater. Res., vol. 20, No. 3, Mar. 2005, pp. 688-695.

Kun'ichi Miyazawa et al., "Characterization of fullerene nanotubes prepared by the liquid-liquid interfacial precipitation method", Science and Technology of Advanced Materials, vol. 6, 2005, pp. 388-393.

Jun-ichi Minato et al., "Morphology of $C_{60}$ nanotubes fabricated by the liquid-liquid interfacial precipitation method", Science and Technology of Advanced Materials, vol. 6, 2005, pp. 272-277.

Jun-ichi Minato et al., "$C_{60}$ fullerene tubes as removable templates", J. Mater. Res., vol. 21, No. 2, Feb. 2006, pp. 529-534.

* cited by examiner

SUBSTRATE HAVING FULLERENE THIN WIRES AND METHOD FOR MANUFACTURE THEREOF

TECHNICAL ART

The present invention relates to a fullerene-attached substrate that has fullerene thin wires adhering to the surface of the substrate, and to a method for manufacturing it.

BACKGROUND ART

Hollow thin wires of fullerene can be produced according to a liquid-liquid interfacial precipitation method. Patent applications for production of hollow fullerene thin wires according to a liquid-liquid interfacial precipitation method have already been made, as in Patent References 1 to 3.

The present applicants have found that hollow thin wires of $C_{60}$ can be produced in a manner of self-organization in a liquid-liquid interfacial precipitation method of using a toluene solution of $C_{60}$, to which a platinum derivative of $C_{60}$, $(\eta^2\text{-}C_{60})Pt(PPh_3)_2$ has been added, and isopropyl alcohol, as in Non-Patent References 1 to 5.

Concretely, hollow $C_{70}$ thin wires, hollow $C_{60}$-15 mol % $C_{70}$ thin wires, and hollow $C_{60}$ thin wires were produced according to a liquid-liquid interfacial precipitation method with a pyridine-saturated solution of fullerene and isopropyl alcohol.

An aligned body of fullerene thin wires may have a possibility of extremely wide-range applications to catalysts, column materials, chemical synthesis templates, field emission devices, field effect transistors, solar cells, fuel cells, lithium ion cells, medicine vectors, solid electrolyte materials, gas sensor devices, photonic crystals, lasers based on the photoluminescence phenomenon in photonic crystals, etc.; and it is considered that the economic effect in practical realization thereof would be enormous; however, it has not been realized to vertically aligned fullerene thin wires that could most readily exhibit these effects, on a substrate.

[Patent Reference 1] Japanese Patent No. 3785454
[Patent Reference 2] Japanese Patent Application No, 2004-194174
[Patent Reference 3] Japanese Patent Application No. 2004-290787
[Non-Patent Reference 1] K. Miyazawa and T. Suga, "Transmission electron microscopy investigation of tubular and capsular needlelike crystals of $C_{60}$ produced by the liquid-liquid interfacial precipitation method", J. Mater. Res., 19[11], (2004), 3145-3148.
[Non-Patent Reference 2] Kun'ichi Miyazawa, Jun-ichi Minato, Tetsuro Yoshii, Masahisa Fujino and Tadatomo Suga, "Structural characterization of the fullerene nanotubes prepared by the liquid-liquid interfacial precipitation method", J. Mater. Res., 20[3], (2005), 688-695.
[Non-Patent Reference 3] Kun'ichi Miyazawa, Jun-ichi Minato, Tetsuro Yoshii and Tadatomo Suga, "Characterization of fullerene nanotubes prepared by the liquid-liquid interfacial precipitation method", Sci. Technol. Adv. Mater., 6[3-4], (2005), 388-393.
[Non-Patent Reference 4] Jun-ichi Minato, Kun'ichi Miyazawa and Tadatomo Suga, "Morphology of $C_{60}$ nanotubes fabricated by the liquid-liquid interfacial precipitation method", Sci. Technol. Adv. Mater., 61$^{-3}$-41, (2005), 272-277.
[Non-Patent Reference 5] J. Minato and K. Miyazawa, "$C_{60}$ fullerene tubes as removable templates", J. Mater. Res., 21[2], (2006), 529-534.

DISCLOSURE OF THE INVENTION

Problems that the Invention is to Solve

In consideration of the situation as above, an object of the invention is to provide a fullerene thin wires-attached substrate in which fullerene thin wires are vertically aligned relative to the substrate, and to provide a method for manufacturing it.

Means for Solving the Problems

The fullerene thin wires-attached substrate of the first embodiment of the present invention is characterized in that fullerene thin wires are vertically aligned on the surface of a substrate composed of a through-hole type porous body having through-holes formed to run through the surface and the back thereof.

The fullerene thin wires-attached substrate of the second embodiment is characterized in that the fullerene thin wires have a hollow structure.

The fullerene thin wires-attached substrate of the third embodiment is characterized in that the fullerene thin wires have a hexagonal cross section.

The fullerene thin wires-attached substrate manufacturing method of the fourth embodiment of the present invention is characterized in that a poor solvent for fullerene is continuously injected from below a good solvent solution of fullerene prepared by dissolving fullerene in a good solvent for fullerene, via a through-hole type porous body to constitute a substrate, thereby moving the liquid-liquid interface formed between the good solvent solution and the poor solvent from the upper surface of the substrate toward the good solvent solution side to grow the fullerene crystal precipitating in the liquid-liquid interface from the upper surface of the substrate toward the good solvent solution side.

The fullerene thin wires-attached substrate manufacturing method of the fifth embodiment is characterized in that the moving speed of the liquid-liquid interface is within a range of from 0.1 μm/min to 1000 μm/min.

The fullerene thin wires-attached substrate manufacturing method of the sixth embodiment is characterized in that the poor solvent for fullerene is injected into the good solvent solution of fullerene under irradiation with a fluorescent lamp.

Advantage of the Invention

Hollow aligned needle-like crystals of fullerene have an extremely wide-range applicability to catalysts, column materials, chemical synthesis templates, field emission devices, field effect transistors, solar cells, fuel cells, lithium ion cells, medicine vectors, solid electrolyte materials, gas sensor devices, photonic crystals, lasers based on the photoluminescence phenomenon of $C_{60}$ hollow needle-like crystals in photonic crystals, etc.; and the economic effect in practical use thereof could be enormous.

According to the invention, fullerene thin wires grow up to the position remotest from the substrate in view of the length thereof; and therefore, they can be most stably kept in contact with various materials in expected various application fields, and can exhibit the expected effect.

Providing the invention, the inventors have succeeded in realizing vertical alignment of fullerene thin wires (needle-like crystals) relative to the substrate according to a new mode of a liquid-liquid interfacial precipitation method through a porous body, neither based on the effect of an external field such as an electric field nor using any intentional means of arranging seed crystals. The possibility has been presented that controlling the liquid-liquid interface moving speed via a porous body may make it possible to give vertically-aligned fullerene thin wires (needle-like crystals), and in addition, controlling the interface moving speed may make it possible to grow hollow fullerene thin wires having a limitless length.

BRIEF DESCRIPTION OF THE DRAWINGS

FIG. 3 is a SEM image of the same vertically-aligned $C_{60}$ hollow needle-like crystals as in FIG. 2, observed from the direction vertical to the alumina film.

BEST MODE FOR CARRYING OUT THE INVENTION

Figure 1:
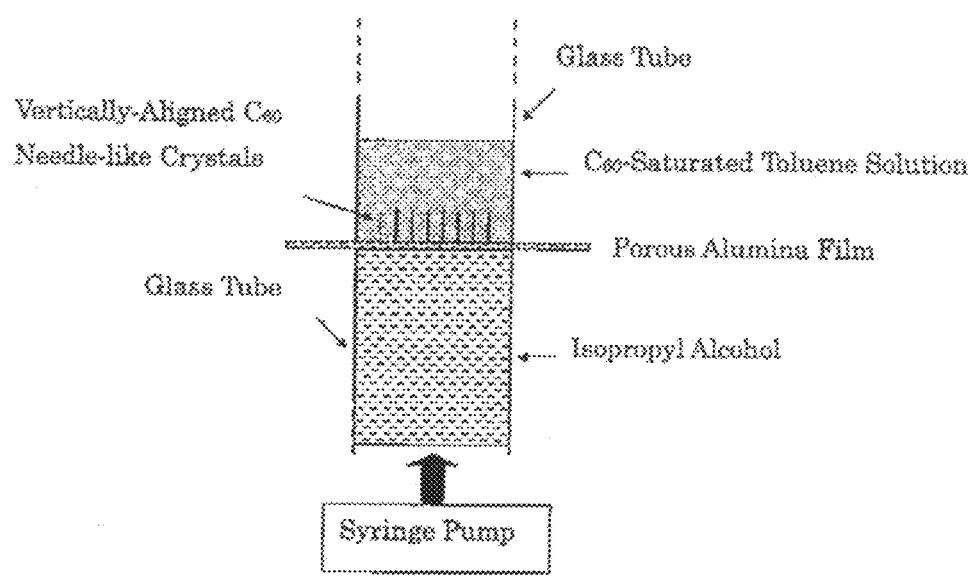
FIG. 1 is a schematic view of an apparatus in which isopropyl alcohol put in a lower glass tube is injected into a $C_{60}$-saturated toluene solution put in an upper glass tube, via a porous alumina film.

Patent Reference 1 is based on the principle that a good solvent solution of fullerene and a poor solvent solution of fullerene are combined to form a liquid-liquid interface of realizing a supersaturation state of fullerene, thereby precipitating fullerene crystal nuclei, and from this, fullerene is densely filled in the direction of the growth axis to thereby grow fullerene thin wires of needle-like crystals.

The present invention is based on the precipitation principle of fullerene thin wires by a good solvent solution of fullerene and a poor solvent.

In the invention, a poor solvent for fullerene is softly injected into a good solvent solution of fullerene prepared by dissolving fullerene in a good solvent for fullerene, via a porous body (for example, a porous film or the like) serving as a substrate, whereby a liquid-liquid interface is formed around the injected poor solvent, and owing to the mutual diffusion of the solvents in the interface, a supersaturation state of fullerene is realized to bring about a fullerene precipitation phenomenon on the substrate; and this is not shown at all by any known cases.

In fact, in supplying fullerene from the liquid-liquid interface where fullerene is supersaturated, to the crystal nuclei of fullerene, the liquid-liquid interface is moved and fullerene is continuously supplied, whereby fullerene thin wires can be continuously grown. Specifically, in the invention, a poor solvent is continuously injected from below a good solvent solution of fullerene via a porous body, whereby the liquid-liquid interface where fullerene is supersaturated is gradually moved from the upper surface of the porous body toward the good solvent solution side in accordance with the growth speed of fullerene thin wires, and fullerene is thereby continuously supplied to the top end of the fullerene thin wires. Finally, fullerene thin wires composed of fullerene needle-like crystals are produced, as vertically aligned to the upper surface of the porous body. The produced fullerene thin wires can be those having a length of from 10 to 500 μm and an outer diameter of from 5 to 100 μm, especially those having a length of from 50 to 400 μm and an outer diameter of from 10 to 50 μm.

Fullerene for use herein includes $C_{60}$, $C_{\xi}$ and other higher-order fullerenes, metal atom-including fullerenes, for example, fullerenes including a metal atom such as La or the like in various types of fullerenes (e.g., fullerene including La in $C_{82}$ fullerene (this may be expressed as La@$C_{82}$)), and fullerene derivatives.

The substrate in the invention is composed of a porous body and must have through-holes that run through the body. This is for the purpose of injecting a poor solvent for fullerene into a good solvent solution of fullerene via the through-holes of the porous body.

The pore size of the through holes in the porous body may be, for example, at least 1 nm that is on the same level as that of the inner diameter of single-wall carbon nanotubes, preferably within a range of from 1 nm to 200 nm, more preferably from 20 nm to 200 nm. The length of the through-holes in the porous body may be, for example, from 1 nm to 1000 μm. The through-holes may be aligned randomly or may be aligned in geometric arrangement. The number of the through-holes may be one, or two or more.

As specific examples of the porous body, there may be mentioned filmy bodies formed of various materials, such as alumina film, ceramic film, plastic film, metal film, glass film, etc.; and the film thickness may be any one falling from 1 nm to 1000 μm. The material of the porous body may be any one not corroded by the solvent for fullerene.

The direction of the porous body relative to the gravitational field may be parallel or vertical thereto, or the porous body may be in any direction thereto.

Any conventional known good solvent for fullerene may be used with no problem for the good solvent for fullerene, including, for example, toluene, xylene, carbon disulfide, benzene, etc.

The poor solvent for fullerene may be any one, including, for example, methyl alcohol, ethyl alcohol, isopropyl alcohol, water, acetic acid, etc.; but preferred is one mutually miscible with the good solvent for fullerene, and usable is any one capable of realizing precipitation of fullerene through contact with each other.

The liquid temperature of the good solvent solution of fullerene or that of the poor solvent in formation of fullerene thin wires may fall within a range of from 0° C. to 25° C., preferably from 5° C. to 10° C.

In the invention, as mentioned above, a poor solvent is injected into a good solvent solution of fullerene prepared by dissolving fullerene in a good solvent for fullerene, to thereby move the liquid-liquid interface in which fullerene is supersaturated, in accordance with the growth speed of fullerene thin wires, whereby fullerene is continuously supplied to the top end of the fullerene thin wires. Accordingly, for effectively growing the fullerene thin wires, it is necessary to suitably define the injection speed of the poor solvent so as to control the moving speed of the liquid-liquid interface to be a predetermined speed. The moving speed of the liquid-liquid interface is, for example, preferably from 0.1 μm/min to 1000 μm/min, more preferably from 50 μm/min to 200 μm/min. In order to control the moving speed of the liquid-liquid interface to be from 0.1 μm/min to 1000 μm/min, it may be considered that the injection speed of the poor solvent is controlled to be from $1 \times 10^{-5}$ mL/min to 1 mL/min. As in Examples given hereinunder, the injection speed of the poor solvent may be from 0.02 to 0.05 mL/min.

The invention is to align fullerene thin wires (needle-like crystals) of fullerene molecules belonging to a carbon material, vertically to the substrate according to a liquid-liquid interfacial precipitation method where a poor solvent for fullerene is brought into contact with a saturated good solvent solution of fullerene via a porous body, not using any electric means such as electric field, or radio frequency wave.

The fullerene thin wires thus aligned vertically to the substrate are referred to as vertically-aligned crystals.

Vertically-aligned crystals may be two types, hollow ones and non-hollow ones; and according to the invention, the fullerene aligned needle-like crystals can have a hollow structure.

The hollow needle-like crystal array of fullerene may be an array of hollow semiconductor needle-like crystals; and therefore, it may be used for sensors for monitoring vapor or liquid adsorption, or as solar cell devices or the like, by fitting electrodes thereto. Further, it may also be used for catalysts, substance carriers for chemicals, liquid/vapor fluid channels, optical waveguides. Since it may have a space in a size of micrometer, large particles or substances having a micrometer size may be filled therein.

In the invention, the fullerene thin wires are aligned vertically to the substrate, and therefore, by designing the alignment mode thereof, they may be photonic crystals. When composited with resin, metal or the like, they may be formed into channels—having porous resins or porous metals. According to a process where a the surface of the alumina film substrate is coated with a resin film, then hollow needle-like crystals of fullerene such as $C_{60}$ or the like are fixed thereon and the alumina film is removed with a suitable reagent such as sodium hydroxide or the like, an array of self-sustained aligned hollow needle-like crystals of fullerene such as $C_{60}$ or the like can be obtained.

The hollow needle-like crystal array of $C_{60}$ can be dissolved in an organic solvent such as toluene or the like, and therefore, it may be used as a removable template in chemical synthesis. Specifically, a substance is produced, using the inner and outer space of the hollow needle-like crystal array of $C_{60}$, and the hollow needle-like crystal array of $C_{60}$ is removed, whereby an aligned novel synthetic substance array can be obtained. By heating at a high temperature, an electroconductive carbon array can be obtained, and it may be used for fuel cell electrode materials, lithium ion cell electrode materials, and many electronic devices such as field emission devices, etc., and also for storage of various gases such as hydrogen gas and the like through porous structure formation.

The method for producing the hollow needle-like crystal array of $C_{60}$ mentioned above may be used, not limited to $C_{60}$ alone, also in production of hollow needle-like crystals comprising $C_{70}$, $C_{76}$ or other higher-order fullerenes, or metal atom-including fullerenes such as La—including $C_{82}$ fullerene or the like. Further, it may also be equally applied to a system where a good solvent solution of a substance except fullerene, and a poor solvent solution of the substance are used.

Non-Patent Reference 2 shows that the growth of $C_{60}$ thin wires is promoted by visible light. In the present invention, fullerene thin wires are produced under irradiation with visible light, whereby the fullerene thin wires can be more effectively grown on the substrate. The irradiation with visible light in this may be substituted with irradiation with light from a fluorescent lamp built in a low-temperature thermostat; and any others capable of generating visible light, for example, light emitting diodes and other fluorescent materials can exhibit the same effect.

EXAMPLES

Excess $C_{60}$ powder (sublimation method, purity 99.95%, MTR Ltd.) was added to absolute toluene (Wako Pure Chemical Industries Ltd., 99.5%), and irradiated with ultrasonic waves for 30 minutes to prepare a toluene solution of $C_{60}$. This was filtered through a Teflon porous filter for syringe (pore size 450 nm, Puradisc™; Whatman Inc., Clifton, N.J., USA) to give a $C_{60}$-saturated toluene solution. All the reagents were just delivered ones, and were not purified before use.

Using a glass filter device having a diameter of 25 mm, vertically-aligned needle-like crystals of $C_{60}$ (hereinafter referred to as vertically-aligned crystals) were produced. The constitution of the apparatus is shown in FIG. 1.

The lower part of the filter device is connected to a syringe which is connected to a syringe pump, and this is set in a low-temperature thermostat (SANYO MIR-153) kept at 5° C. During the experiment, the fluorescent lamp inside the a low-temperature thermostat was kept put on. Accordingly, the growth of needle-like crystals is expected to be promoted.

An anodized alumina film (porous alumina film) (trade name, Anodise 25, pore size 200 nm and 20 nm, Whatman. Inc.) was fitted to the upper face of the filter. 2 mL of the $C_{60}$-saturated toluene solution was poured onto the upper side (surface) of the film, and a high-purity isopropyl alcohol (IPA, 99.9%, Wako Pure Chemical Industries Ltd.) was injected into the $C_{60}$-saturated toluene solution through a syringe from the lower side (back) of the film at an injection speed of from 0.02 to 0.05 mL/min, thereby producing vertically-aligned crystals (fullerene thin wires). The interface moving speed was on the order of about 100

The produced vertically-aligned crystals were dried in air at 5° C. in the same low-temperature thermostat. This was observed with a scanning electronic microscope (Hitachi-4800, FE-SEM) at an accelerating voltage of 10 kV. This was analyzed through X-ray diffractiometry with M03XHF22 (MAC Science Co., Ltd.), and through IR spectrometry with FTS-60 (Bio-Rad DigiLab Division, Cambridge, Mass., USA).

Figure 2:
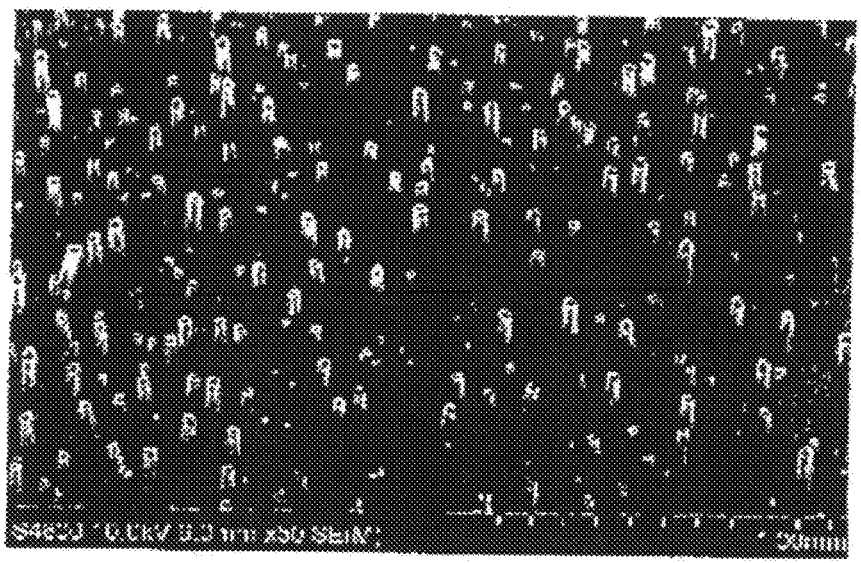
FIG. 2 is a scanning electronic microscope (SEM) image of $C_{60}$ hollow needle-like crystals grown on a porous alumina film as vertically aligned thereto, observed from the oblique upward direction.
Figure 8:
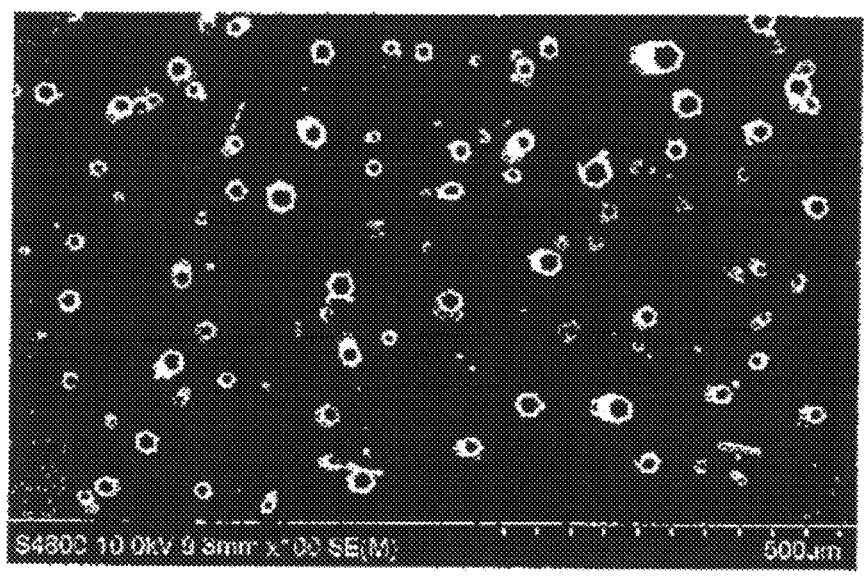

As shown in FIG. 2, it is known that hollow needle-like crystals of $C_{60}$ uniformly grew from the surface of the porous alumina film. As shown in FIG. 3, it is also known that the hollow needle-like crystals of $C_{60}$ grew as aligned vertically to the porous alumina film. As a result of observation, it was found that these vertically aligned crystals formed on the entire surface of the porous alumina film.

Figure 4:
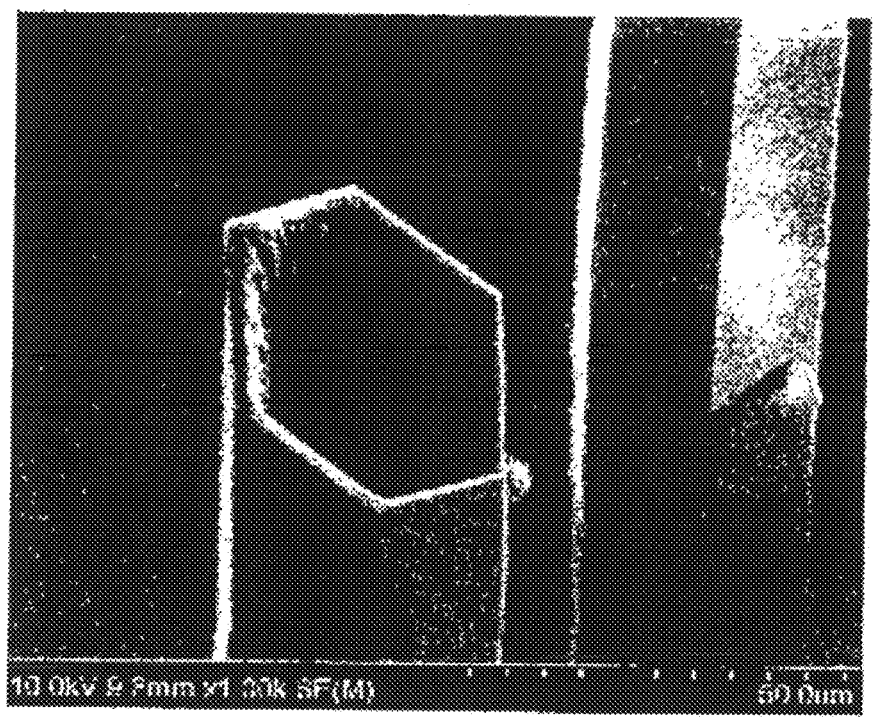
FIG. 4 is a SEM image of a vertically-aligned $C_a$ hollow needle-like crystal, observed with high magnification from the oblique upward direction.

Prom the high-magnification image of FIG. 4, it is obvious that the needle-like crystals of FIGS. 2 and 3 have a hollow structure. When the injection speed of IPA into the $C_{60}$-saturated toluene solution was 0.02 mL/min, the outer diameter of the hollow needle-like crystals was from 5 to 30 μm, the wall thickness thereof was from 1 to 3 μm, and the length thereof was about 500 μm. When the injection speed was 0.03 mL/min, the outer diameter increased to 50 μm.

Figure 5:
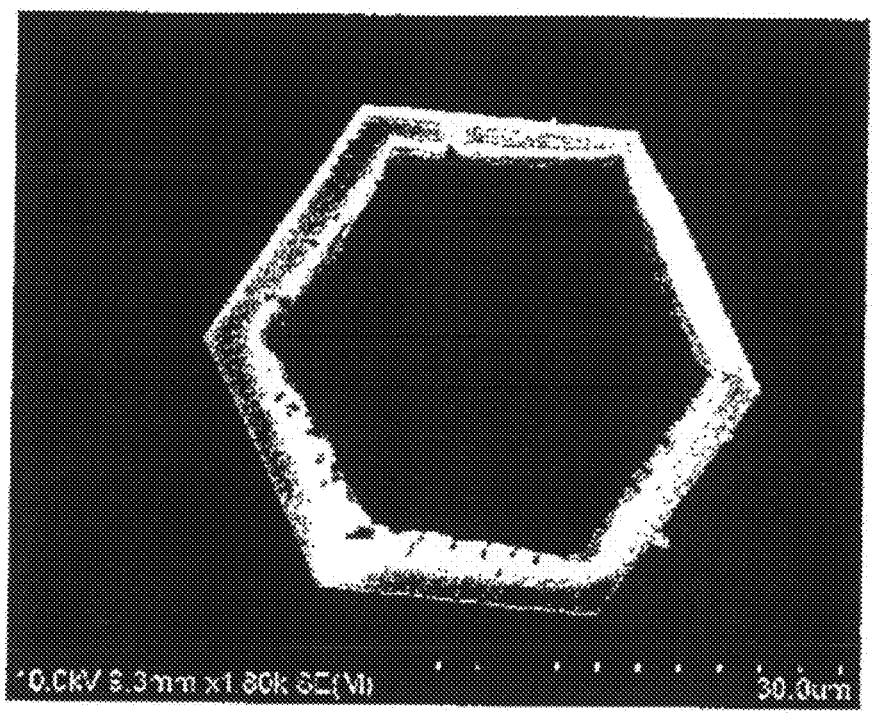
FIG. 5 is a SEM image of a vertically-aligned $C_{60}$ hollow needle-like crystal, observed with high magnification from the direction vertical to the alumina film.

Further, as shown in FIG. 5, it is known that the needle-like crystals have a hexagonal cross section and have a hollow structure. The hexagonal cross section means that the vertically-aligned crystals had a solvated hexagonal crystal structure in the solution.

The outer surface of the vertically-aligned crystals was smooth but the inner surface thereof had coarse irregularities formed thereon and was gelled; and this suggests that the sol-like liquid having existed inside it flowed out to form the hollow. This may also be known from the condition that grooves were formed in the inner wall along the direction of the growth axis as in FIG. 4. It is understood that the inside of the needle-like crystals was formed of a soft and gel-like substance, and the surface layer thereof was crystallized to form a hexagonal crystal structure. It is considered that the crystallization of the surface layer would be caused by the light from the fluorescent lamp set inside the low-temperature thermostat.

It is considered that, when IPA is injected into the $C_{60}$-saturated toluene solution through the pores of the alumina film, then an interface is formed between the toluene solution and IPA, and $C_{60}$ supersaturated in the interface is precipitated out to give vertically-aligned crystals as pillar crystals. The liquid-liquid interface plays an important role as the crystal precipitation site, and therefore, the injection speed of IPA must be suitably selected, or that is, the above-mentioned injection speed of from 0.02 to 0.05 mL/min was employed herein.

In case where a porous alumina film having a diameter of 25 mm was used and when IPA was injected into the $C_{60}$-saturated toluene solution at an injection speed of 0.05 mL/min or more, then it was known that vertically-aligned crystals could not be formed. At the injection speed higher than this, $C_{60}$ crystals precipitated in the solution but could not grow from the porous alumina film.

It is also known that the diameter and the length of the vertically-aligned crystals have no relation to the pore size (20 nm and 200 nm) of the porous alumina film. This indicates that the crystal nuclei precipitate on the upper surface of the porous alumina film and means that the crystal nuclei do not precipitate inside the film pores.

Figure 6:
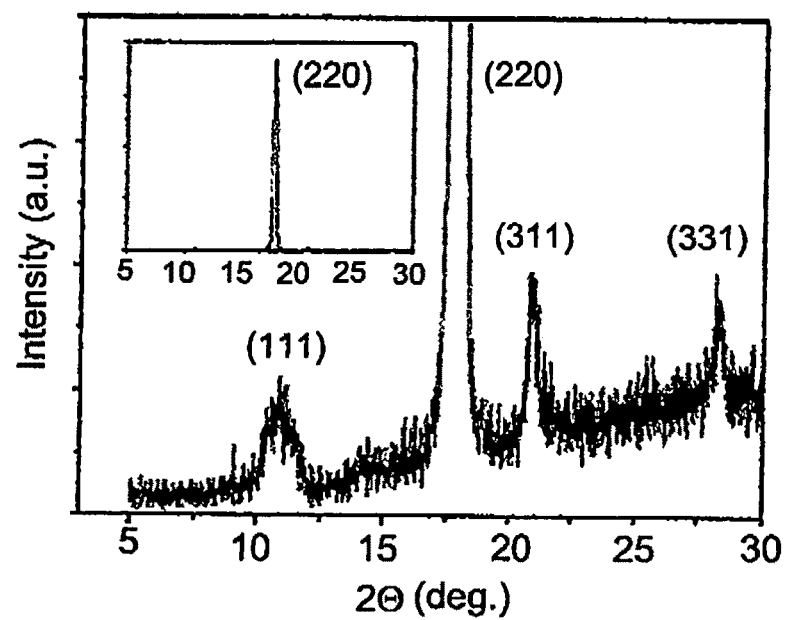
FIG. 6 is an X-ray diffraction pattern of a vertically-aligned $C_{60}$ hollow needle-like crystal.

As in FIG. 6 showing an X-ray diffraction pattern, the vertically-aligned crystals can be indexed as a face-centered cubic crystal structure (lattice constant a=1.41 nm). Further, since the (220) peak is extremely higher than the other peaks, it is known that the vertically-aligned crystals are single crystals and that the growth axis of the vertically-aligned crystals is parallel to the [110]axis (face-centered cubic crystal).

Figure 7:
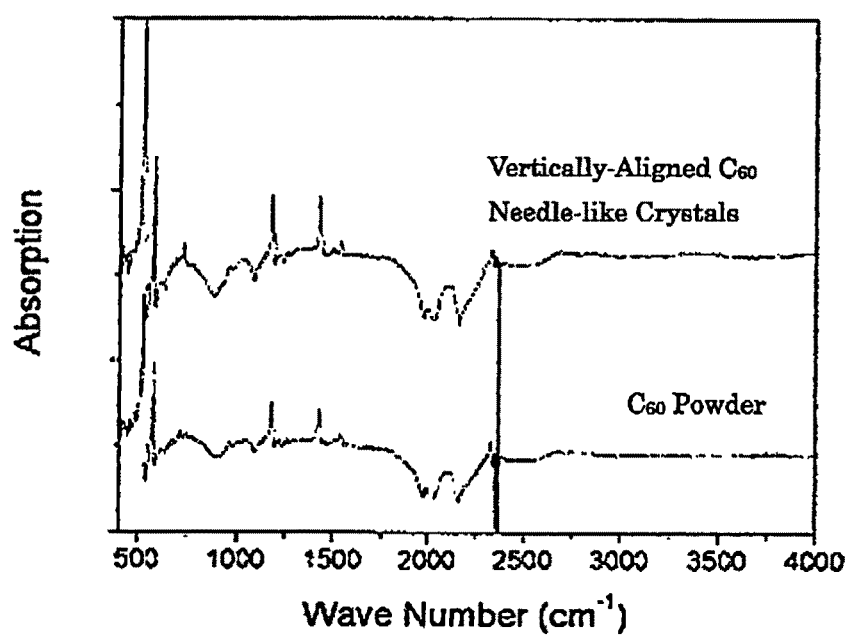
FIG. 7 shows Fourier transform IR absorption spectra of a vertically-aligned $C_{60}$ hollow needle-like crystal and a 99.95% purity $C_{60}$ powder.

In the result of Fourier transform IR spectrometry (FT-IR) shown in FIG. 7, the profile characteristic of the vertically-aligned crystals well corresponds to that of a pure $C_{60}$ powder, and it is known that the vertically-aligned crystals contain little solvent and have high purity.

In this Example as above, needle-like crystals of $C_{60}$ were produced by injecting isopropyl alcohol into a $C_{60}$-saturated toluene solution via a porous alumina film. The porous alumina film usable herein may have a pore size of from 20 nm to 200 nm; however, the film may have any other pore size than this. The moving speed of the liquid-liquid interface of the $C_{60}$-saturated toluene solution and isopropyl alcohol resulting from injection may be from 0.1 μm/min to 1000 μm/min, but is more preferably from 50 to 200 μm/min. The liquid temperature may be within a range of from 0° C. to 25° C., preferably from 5° C. to 10° C. During the production process, the crystals are preferably produced under irradiation with a fluorescent lamp. The fullerene thin wires having grown from the surface of the porous body are hollow or non-hollow needle-like crystals, and the crystal structure thereof is a hexagonal or face-centered cubic crystal structure.

The invention claimed is:

1. A method for manufacturing in liquid a fullerene thin wires-attached substrate, which comprises continuously injecting a poor solvent for fullerene from below a good solvent solution of fullerene prepared by dissolving fullerene in a good solvent for fullerene, via a through-hole in a substrate having a through-hole porous body, thereby moving a liquid-liquid interface formed between the good solvent solution and the poor solvent upwards to grow thin-wire fullerene crystals precipitating in the liquid-liquid interface from the upper surface of the substrate, thereby achieving the fullerene thin wires-attached substrate, wherein the fullerene thin wires-attached substrate is manufactured in the liquid having a temperature of from 0° C. to 25° C.

2. The method for manufacturing a fullerene thin wires-attached substrate as claimed in claim 1, wherein a moving speed of the liquid-liquid interface is within a range of from 0.1 μm/min to 1000 μm/min.

3. The method for manufacturing a fullerene thin wires-attached substrate as claimed in claim 1, wherein the poor solvent for fullerene is injected into the good solvent solution of fullerene under irradiation with a fluorescent lamp.

4. The method for manufacturing a fullerene thin wires-attached substrate as claimed in claim 2, wherein the poor solvent for fullerene is injected into the good solvent solution of fullerene under irradiation with a fluorescent lamp.

* * * * *

UNITED STATES PATENT AND TRADEMARK OFFICE
CERTIFICATE OF CORRECTION

PATENT NO. : 8,685,160 B2  
APPLICATION NO. : 12/733411  
DATED : April 1, 2014  
INVENTOR(S) : Seung, II et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this
Twenty-ninth Day of September, 2015

Michelle K. Lee
*Director of the United States Patent and Trademark Office*